H. SHAPIRO.
PHOTOGRAPHIC CONTINUOUS PRINTING APPARATUS AND PROCESS.
APPLICATION FILED APR. 17, 1918.
1,371,400.
Patented Mar. 15, 1921.
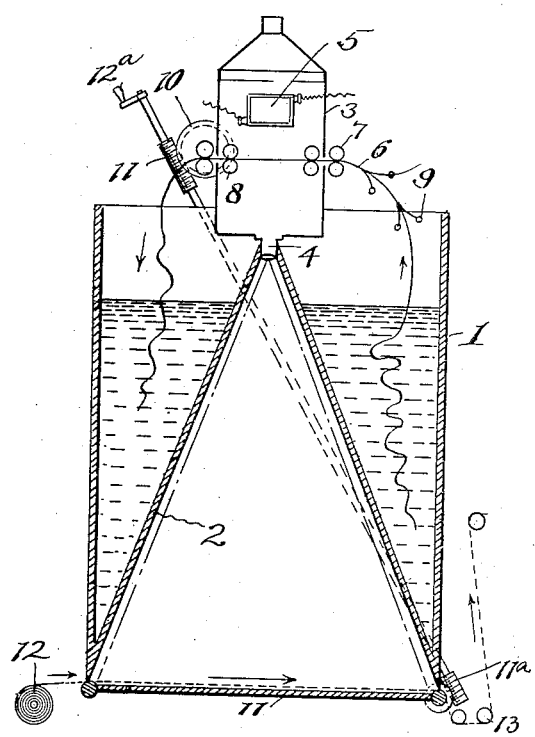

UNITED STATES PATENT OFFICE.

HERMAN SHAPIRO, OF CLEVELAND, OHIO, ASSIGNOR OF ONE-HALF TO A. E. BERN-STEEN AND FRANK S. DAY.

PHOTOGRAPHIC CONTINUOUS-PRINTING APPARATUS AND PROCESS.

1,371,400.     Specification of Letters Patent.     Patented Mar. 15, 1921.

Application filed April 17, 1918. Serial No. 229,185.

*To all whom it may concern:*

Be it known that I, HERMAN SHAPIRO, a citizen of the United States, residing at Cleveland, in the county of Cuyahoga and State of Ohio, have invented a certain new and useful Improvement in Photographic Continuous-Printing Apparatus and Processes, of which the following is a full, clear, and exact description.

The purpose of this invention is to provide a process and apparatus by which a strip of photographic negatives, usually in the form of a film, may be conveniently enlarged, and printed upon a strip of sensitized photographic material.

It is present practice, so far as I am aware, in the photographic printing of pictures taken upon a continuous film strip, to sever the film strip into convenient lengths for printing and if a continuous photograph be desired, to subsequently match up the finished prints.

The time consumed by this method in proceeding from the development of the film to the finished picture is considerable, and there are occasions when the time element is an important factor. For instance, in aerial photography for military purposes where during a fly of a flying machine, a strip of film has been exposed to photograph the country over which the machine has been flying, it is important that the finished photographic print be in the hands of those requiring it as soon as possible.

The method and apparatus herein disclosed are eminently adapted for this purpose, and even where time is not an important element, the advantage of producing enlargements at low cost still remains.

Generally speaking, the invention may be said to comprise the elements and combinations thereof set forth in the accompanying claims.

Reference should be had to the accompanying drawings forming a part of this specification, in which the figure is an elevation with portions in section of an apparatus embodying my invention and designed to carry out the method of my invention.

The apparatus and method of my invention is used in connection with the printing and development of a photographic print or prints commencing with the developed film.

In proceeding, it is not necessary that the film be dried, as the apparatus provides a means for ridding the film of its excess water just prior to the passage of the film through that portion of the apparatus where the projection of the picture takes place.

In general the method consists in moving a negative strip in parallel relationship with a strip of sensitized photographic material to be printed upon, the negative strip and the printing strip being moved at definite relative rates of speed so as to maintain a proper printing relationship. Between the negative strip and the printing strip is a projecting lens by which the enlargement of the negative is accomplished, and behind the moving negative strip is a source of light. The photographic strip moves in front of the lens before mentioned, and the distance between the lens and the photographic strip is determined by the ratio of enlargement which is desired.

The negative strip and the photographic strip move in opposite directions, and the ratio of speed at which the negative strip moves with respect to the printing strip is the same ratio as the ratio of enlargement. That is to say, if the print from the negative is to be enlarged four times, the photographic strip will move four times as fast as the negative strip.

In the drawing I have indicated an apparatus by which this method may be carried out, and the apparatus comprises a tank 1. In substantially the central portion of the tank there is a conical member 2, which at its upper end supports a box 3, in the end of which box is a lens of well-known construction, which is mounted at 4. Within the box 3 there is a source of illumination indicated at 5, and between the source of illumination and the lens the film strip 6 is moved. The film strip is supported and moved in its passage through the receptacle or box 3 by means of two sets of rollers indicated at 7 and 8, these rollers bearing upon the negative strip with sufficient pressure to cause movement of the same when the rollers are turned.

The portion within the tank 1 surrounding the member 2 is conveniently shaped for the reception of a body of water which receives the film before it is delivered to the rollers 7 and 8 and after its passage through the rollers, the water being provided to prevent portions of the film sticking to each other as the film may curl.

In advance of the rollers 7, there are wipers 9. These wipers comprise flexible rubber members arranged in pairs, and between the rubber members of each pair the film passes, thereby removing the excess water from the film but without injury to the film surface.

One or more of the rolls of the sets of rolls 7 and 8 may be actuated, but usually it will be only necessary to actuate two of the rolls which may be accomplished by means of a worm gear 10 which coöperates with a worm 11 operated by the handle 12ª.

At the lower end of the receptacle 1, a support or back 11 is arranged, across which the strip of sensitized photographic material to be printed upon may be supported as it is moved. A roll of sensitized photographic material is indicated at 12, which therefore provides a source of photographic printing material. The photographic strip passes across the support 11 and beneath rollers 13 on its way to the devices which in turn receive the strip of sensitized material after printing for the purpose of developing, fixing, hardening, washing, etc. Certain or all of the rollers over which the sensitized strip passes may be driven and for simultaneously driving the rollers which move the film and the rollers which move the strip, the same shaft which carries the worm 11 may be extended and support the worm 11ª which is suitably geared to rollers 13.

The negative strip which has been described is in most instances a strip of film carrying a series of negatives sequentially arranged. The film strip may be a strip containing a series of sequential pictures made with a moving picture camera, or it may be a film strip carrying a series of negatives of entirely different subject matter, and it is within the province of my invention to suitably mount a series of detached negatives upon a suitable strip which will convey the negatives through the enlarging apparatus in the manner which has been described.

Furthermore, while I have described the invention under circumstances where the negative strip and the sensitized photographic material strip are constantly moved during the printing operation, it is within the province of my invention to move the negative strip and the printing strip intermittently, that is to say, moving the negative strip a proper distance to frame a negative with respect to the enlarging lens, successively, and to move the strip of sensitized photographic printing material intermittently and successively in accordance with the movement of the negative strip.

Having described my invention, I claim:—

1. In an apparatus of the character described, a member having a central converging wall portion, said member also being provided with other walls which surround the said central portion, the space between the said walls serving as a container, a lens mounted at the end of the converging wall portion, means for guiding and supporting a film strip, which means lies beyond the lens and means for guiding a sensitized strip, which means is located at the divergent portion of the said slanting wall.

2. In an apparatus of the character described comprising a member having outer walls and an inner converging wall portion, the space between the said walls serving as a receptacle, a lens located at the inner converging part of the converging wall portion, a housing associated with the lens, means for guiding and supporting the film strip, said means being carried by the housing, means for guiding a strip of sensitized material which means is associated with the divergent portion of the aforesaid inner wall.

In testimony whereof, I hereunto affix my signature.

HERMAN SHAPIRO.